United States Patent
Shigemizu

(10) Patent No.: US 11,984,681 B2
(45) Date of Patent: May 14, 2024

(54) MALE CONNECTOR, AND ACCOMMODATING DEVICE COMPRISING SAME

(71) Applicant: HONDA MOTOR CO., LTD., Tokyo (JP)

(72) Inventor: Nobuo Shigemizu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 402 days.

(21) Appl. No.: 17/279,244

(22) PCT Filed: Sep. 27, 2019

(86) PCT No.: PCT/JP2019/038075
§ 371 (c)(1),
(2) Date: Mar. 24, 2021

(87) PCT Pub. No.: WO2020/067395
PCT Pub. Date: Apr. 2, 2020

(65) Prior Publication Data
US 2022/0006223 A1  Jan. 6, 2022

(30) Foreign Application Priority Data

Sep. 27, 2018 (JP) .................... 2018-181945

(51) Int. Cl.
| | | |
|---|---|---|
| H01R 13/05 | (2006.01) | |
| B60L 50/64 | (2019.01) | |
| H01M 10/46 | (2006.01) | |
| H01M 50/249 | (2021.01) | |
| H01M 50/543 | (2021.01) | |

(Continued)

(52) U.S. Cl.
CPC ............ H01R 13/055 (2013.01); B60L 50/64 (2019.02); H01M 10/46 (2013.01);
(Continued)

(58) Field of Classification Search
CPC ............ H01R 13/055; H01R 13/112; H01R 13/5227; H01R 2201/26; B60L 50/64
(Continued)

(56) References Cited

U.S. PATENT DOCUMENTS 9,331,324 B2 * 5/2016 Kwak ............... H01R 13/40
9,413,039 B2 * 8/2016 Kwak ............... H01M 10/425
(Continued)

FOREIGN PATENT DOCUMENTS

CN    100505452    6/2009
CN    205846332    12/2016
(Continued)

OTHER PUBLICATIONS

Taiwanese Office Action for Taiwanese Patent Application No. 108135249 dated Apr. 26, 2023.
(Continued)

*Primary Examiner* — Peter G Leigh
(74) *Attorney, Agent, or Firm* — Amin, Turocy & Watson, LLP

(57) ABSTRACT

The present invention relates to a male connector and to an accommodating device. The male connector comprises a plurality of male terminals and a support base. The plurality of male terminals are connected to a plurality of female terminals. The support base holds the plurality of male terminals with spacing therebetween in a line-up direction. The plurality of male terminals protrude upwards from an upper surface of the support base. An incline section is formed on the upper surface of the support base, said incline section having a height difference in an intersecting direction that intersects a plane including the protrusion direction and the line-up direction of the plurality of male terminals.

8 Claims, 7 Drawing Sheets

(51) Int. Cl.
  H01R 13/11 (2006.01)
  H01R 13/52 (2006.01)
  *H01M 50/204* (2021.01)
  *H01M 50/224* (2021.01)
  *H01M 50/227* (2021.01)
  *H02J 7/00* (2006.01)

(52) U.S. Cl.
  CPC ....... H01M 50/249 (2021.01); H01M 50/543 (2021.01); H01R 13/112 (2013.01); H01R 13/5227 (2013.01); *H01M 50/204* (2021.01); *H01M 50/224* (2021.01); *H01M 50/227* (2021.01); *H01R 2201/26* (2013.01); *H02J 7/0042* (2013.01)

(58) Field of Classification Search
  USPC ......................................................... 439/884
  See application file for complete search history.

(56) References Cited

U.S. PATENT DOCUMENTS

| | | |
|---|---|---|
| 2005/0227542 A1 | 10/2005 | Fukushima et al. |
| 2008/0061738 A1 | 3/2008 | Hanawa et al. |

FOREIGN PATENT DOCUMENTS

| | | | |
|---|---|---|---|
| EP | 2280436 | 2/2011 | |
| EP | 2280436 A2 * | 2/2011 | ............... B60K 1/04 |
| EP | 2416407 | 2/2012 | |
| EP | 2416407 A1 * | 2/2012 | ............. B60L 50/64 |
| JP | 2008-066148 | 3/2008 | |
| JP | 2012-038531 | 2/2012 | |
| JP | 3193986 | 10/2014 | |
| JP | 2017-144906 | 8/2017 | |
| WO | 01/26211 | 4/2001 | |

OTHER PUBLICATIONS

International Search Report and Written Opinion for International Application No. PCT/JP2019/038075 dated Nov. 19, 2019, 13 pages.

Extended European Search Report for European Patent Application No. 19865100.2 dated Oct. 14, 2021.

Chinese Office Action for Chinese Patent Application No. 201980063837.1 dated Dec. 15, 2022.

* cited by examiner

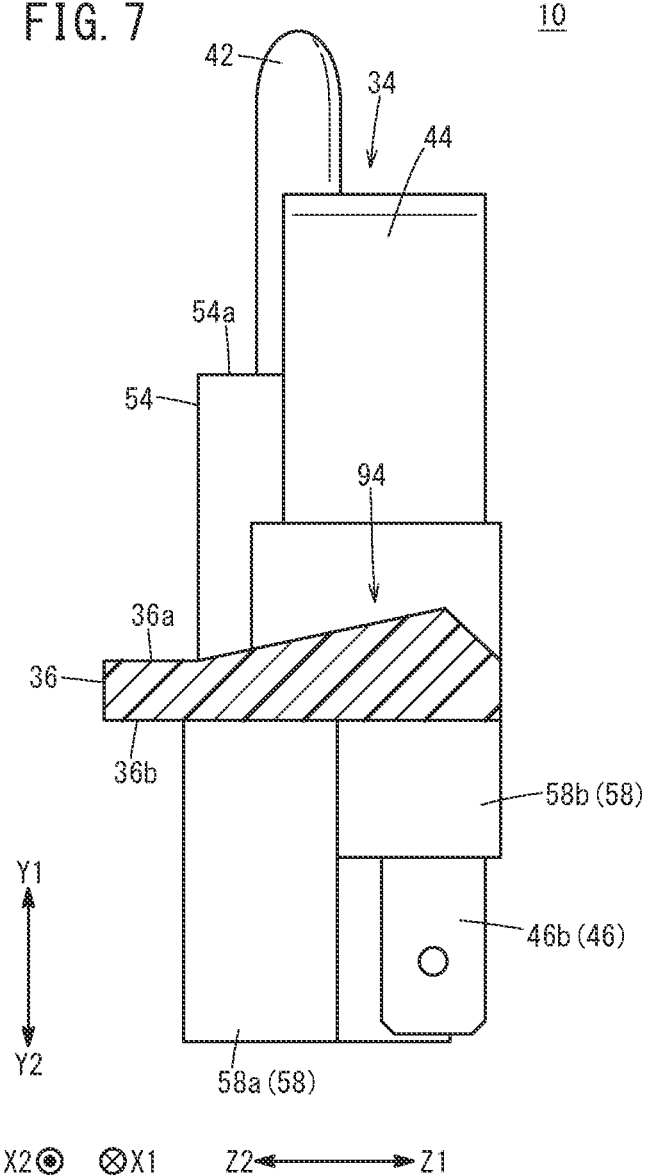

MALE CONNECTOR, AND ACCOMMODATING DEVICE COMPRISING SAME

TECHNICAL FIELD

The present invention relates to a male connector provided with a plurality of male terminals, and an accommodating device including the male connector.

BACKGROUND ART

For instance, as described in Japanese Laid-Open Patent Publication No. 2008-066148, a male connector having a plurality of male terminals has been known. The plurality of male terminals are inserted into female terminals of a female connector, whereby electric power or signals are transmitted between the male and female terminals. The male connector of the kind is installed, for example, on the bottom in an accommodating unit that accommodates a battery pack, and is electrically connected to a female connector provided for the battery pack when electric power is supplied from the battery pack to an external load and when the battery pack is charged.

In particular, the plurality of male terminals stand at intervals and protrude upward from the bottom of the accommodating unit. In addition, the female terminals are provided on the bottom of the battery pack. Thus, when the battery pack is accommodated in the accommodating unit along the vertical direction, the male terminals within the accommodating unit are inserted into the female terminals of the battery pack, whereby the male terminals and the female terminals are electrically connected.

SUMMARY OF INVENTION

In the case of the male connector installed on the bottom of the accommodating unit as above, there is concern that if water such as rainwater entering into the accommodating unit stagnates in between the male terminals, fault currents will occur between the male terminals. For this reason, it is desirable to prevent the stagnation of water between the male terminals.

The present invention has been made to solve the above problem, and an objective is to provide a male connector and an accommodating device including the male connector that can prevent water from stagnating in between a plurality of male terminals.

One aspect of the present invention is a male connector (for example, a male connector 10 of the embodiments) that includes a plurality of male terminals (for example, male terminals 44 of the embodiments) connected to a plurality of female terminals (for example, female terminals 32 of the embodiments), wherein the female terminals and the male terminals are connected and transmit electric power or a signal, the male connector further including a support (for example, a support 36 of the embodiments) configured to support the male terminals disposed at intervals in an arrangement direction, wherein the male terminals protrude upward from an upper surface (for example, an upper surface 36a of the embodiments) of the support, and the upper surface of the support is formed with an inclined portion (for example, a slope 50, 94 of the embodiments) having a height difference in a crossing direction that crosses a plane that contains the arrangement direction and a protruding direction in which the male terminals protrude.

Another aspect of the present invention is an accommodating device (for example, an electric vehicle 16, a battery pack charging device 20 of the embodiments) that includes a male connector that includes a plurality of male terminals connected to a plurality of female terminals) provided for an electricity storage device (for example, a battery pack 12 of the embodiments), wherein the female terminals and the male terminals are connected and transmit electric power or a signal, the male connector further including a support configured to support the male terminals disposed at intervals in an arrangement direction, wherein the male terminals protrude upward from an upper surface of the support, and the upper surface of the support is formed with an inclined portion having a height difference in a crossing direction that crosses a plane that contains the arrangement direction and a protruding direction in which the male terminals protrude.

The present invention can guide water from a gap between male terminals to the outside of the gap due to the height difference in the inclined portion provided on the upper surface of the support. Consequently, it is possible to prevent water such as rainwater from stagnating between the male terminals and as a result, it is possible to prevent fault currents from occurring between the male terminals.

The above objectives, features, and advantages will be easily understood from the following description explained in conjunction with the accompanying drawings.

BRIEF DESCRIPTION OF DRAWINGS

FIG. 7 is a cross-sectional view of a male connector according to another embodiment of the present invention.

DESCRIPTION OF EMBODIMENTS

Figure 1:
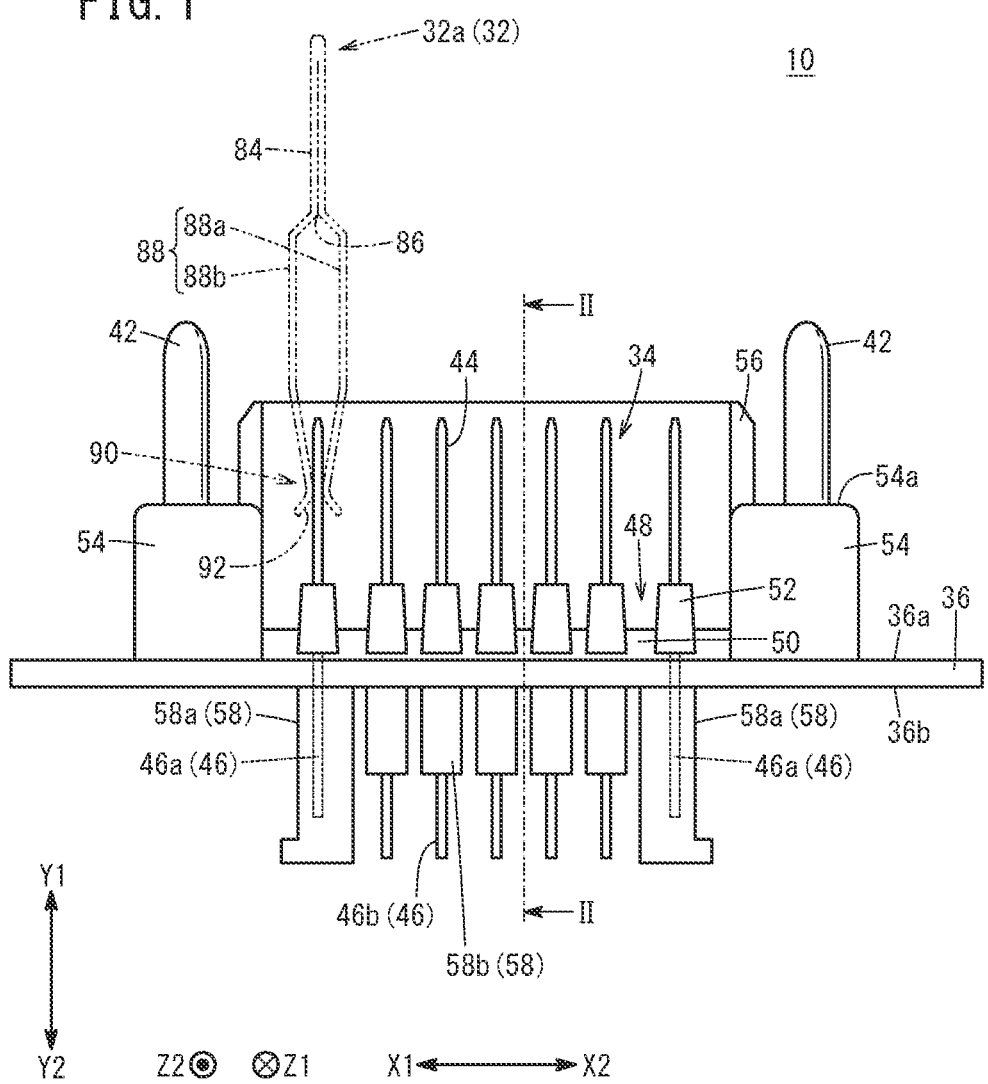
FIG. 1 is a front view of a male connector according to an embodiment of the present invention.

Preferred embodiments of a male connector and an accommodating device according to the present invention are hereinafter described with reference to the attached drawings. Note that in the description below, components providing the same or similar functions and effects are given the same reference numeral and repeated explanations may be omitted.

Figure 2:
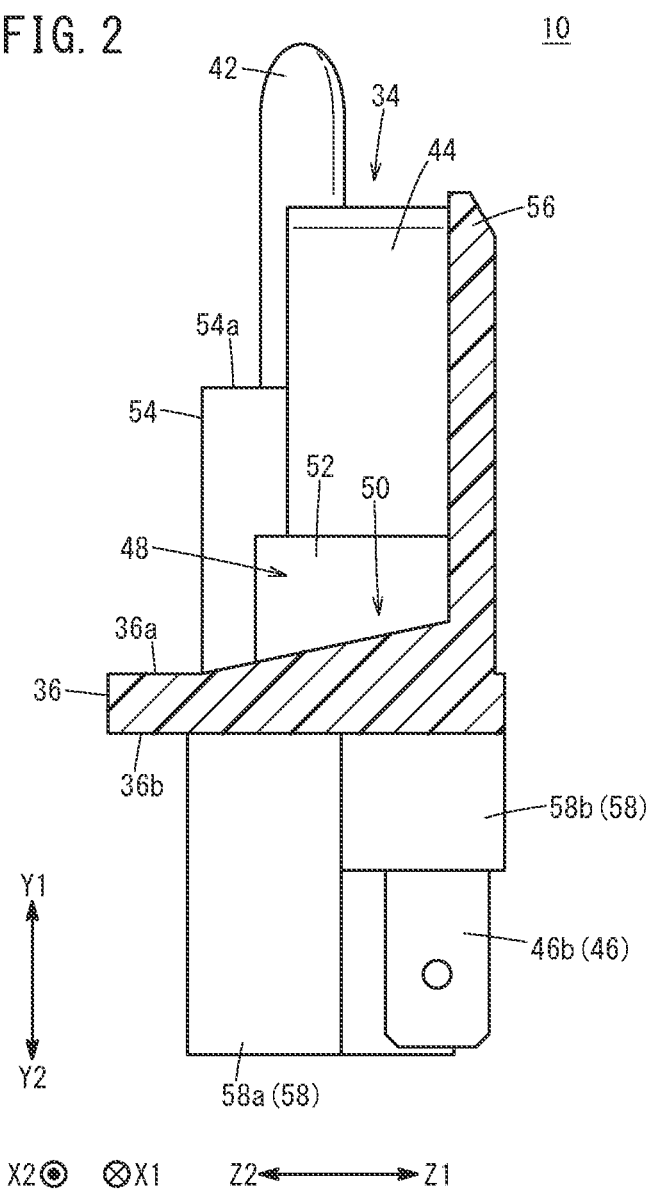
FIG. 2 is a cross-sectional view along a line II-II of FIG. 1.
Figure 3:
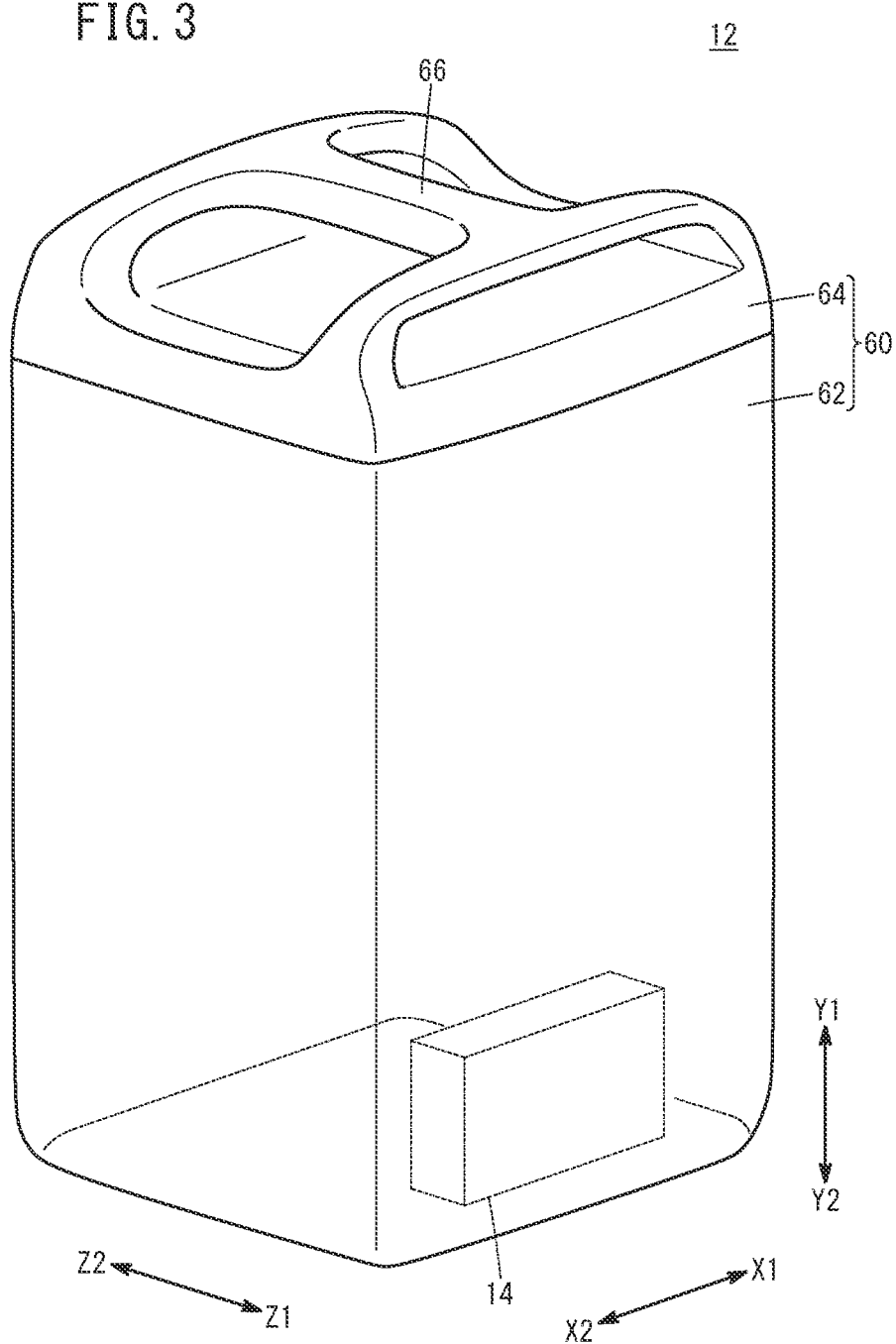
FIG. 3 is an exterior perspective view of a battery pack including a female connector provided with female terminals into which male terminals shown in FIG. 1 are inserted.

In the description below is explained an example where a male connector 10 according to the present embodiment shown in FIGS. 1 and 2 is electrically connected to a female connector 14 that is provided for a battery pack (electricity storage device) 12 shown in FIGS. 3 and 4. That is, in the present embodiment, the male connector 10 (FIG. 1) is provided for a battery pack accommodating unit that accommodates the battery pack 12 (FIG. 3). Examples of the battery pack accommodating unit include a battery pack accommodating unit 18 provided for an electric vehicle (accommodating device, vehicle) 16 shown in FIG. 5, and a battery pack accommodating unit 22 provided for a battery pack charging device (accommodating device, charging device) 20 shown in FIG. 6.

The male connector 10 may be electrically connected to a female connector other than the female connector 14 (FIG. 2) that is provided for the battery pack 12. The male connector 10 does not have to be provided for the battery pack accommodating unit 18, 22 (FIGS. 5 and 6).

Figure 5:
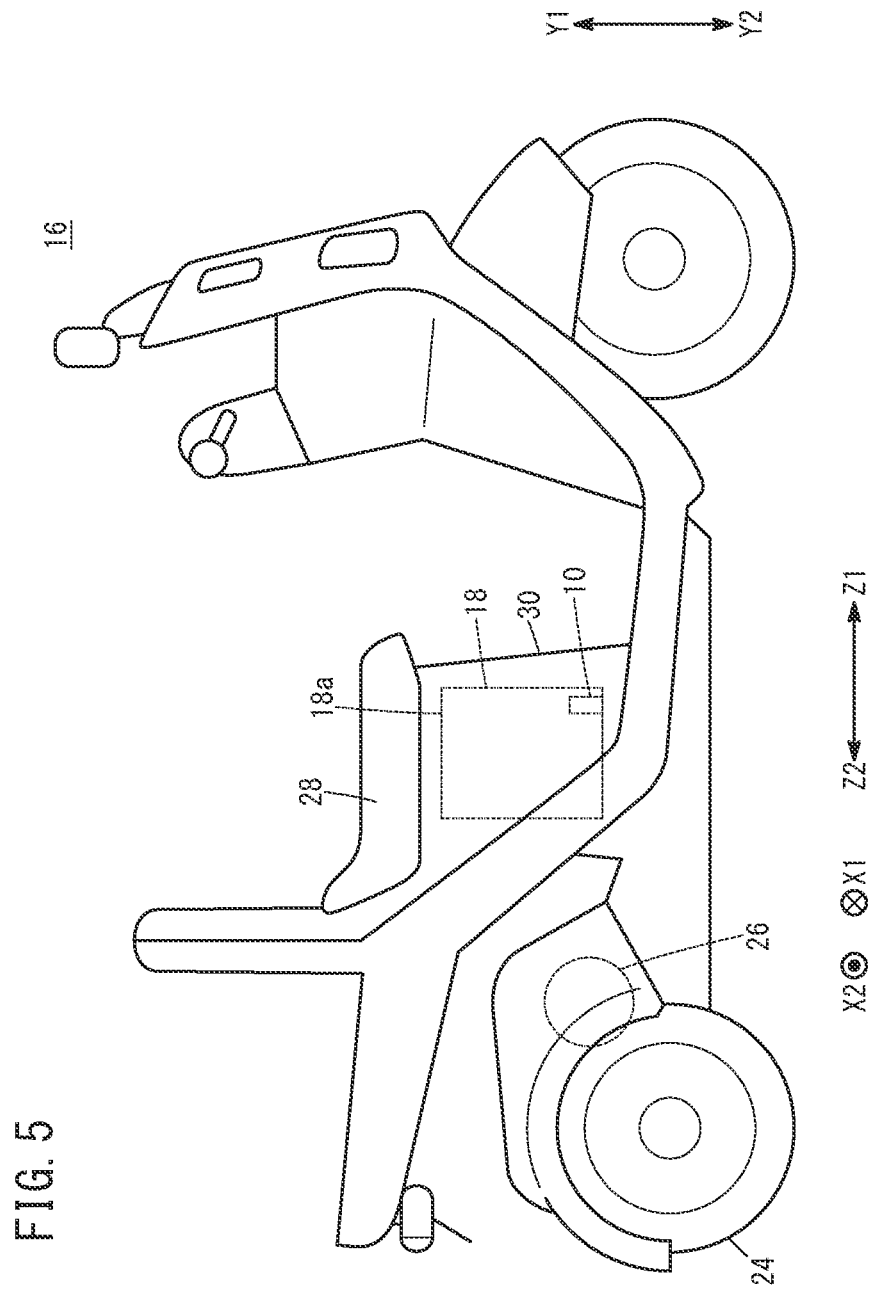
FIG. 5 is a schematic side view of an electric vehicle according to an embodiment of the present invention.
Figure 6:
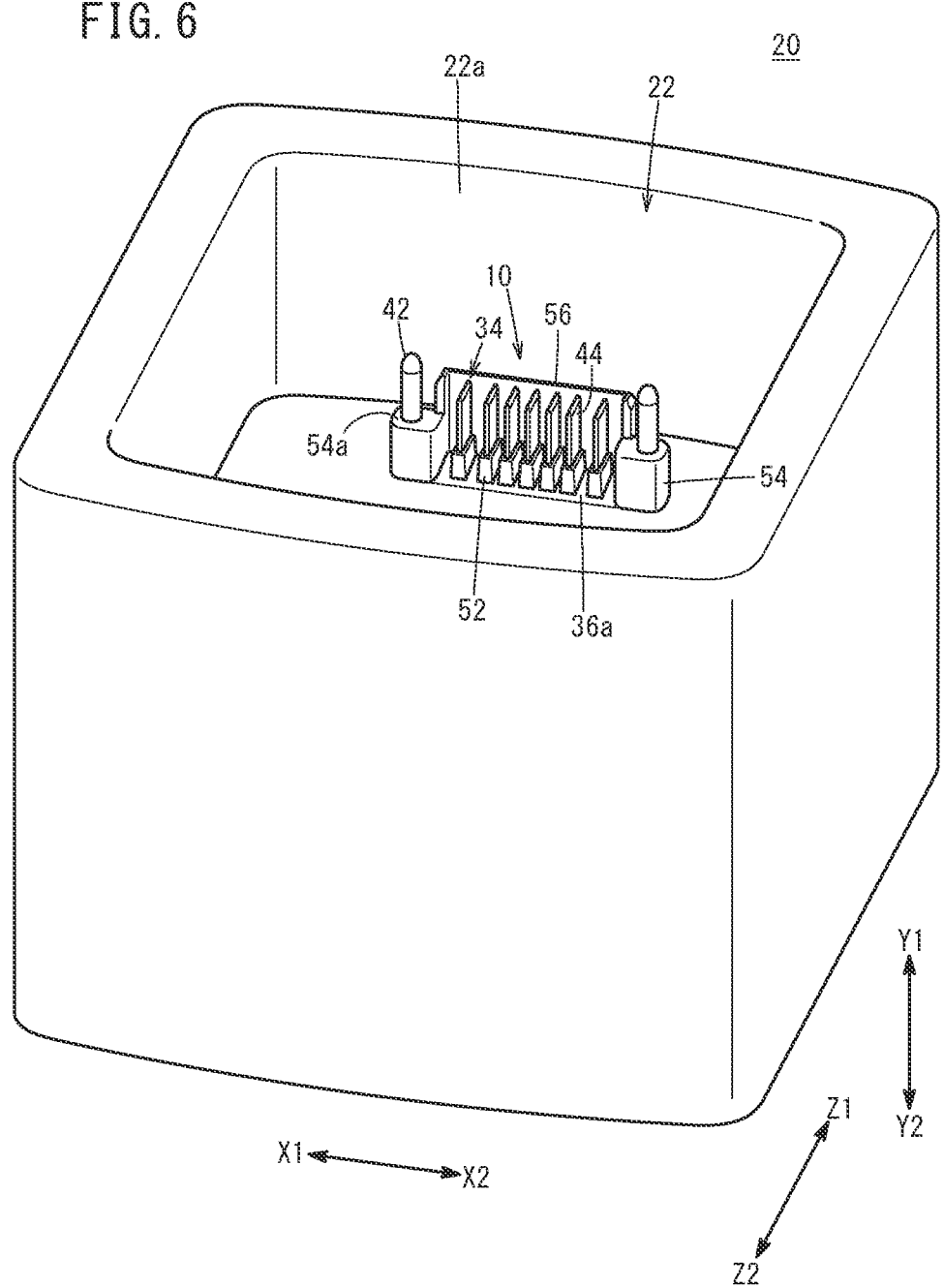
FIG. 6 is a perspective view of a battery pack charging device according to an embodiment of the present invention.

With reference to FIG. 5, the electric vehicle 16 provided with the battery pack accommodating unit 18 according to the present embodiment is briefly explained. Below is given an example where the electric vehicle 16 is a saddle-type electric motorcycle. However, the electric vehicle 16 may be a pedelec (not shown) or a battery electric vehicle (not shown).

The electric vehicle 16 is provided with a driving motor 26 that is a driving source installed near a rear wheel 24. Electric power of the battery pack 12 (FIG. 3) is supplied to the driving motor 26, whereby the electric vehicle 16 can drive and perform other functions. Further, the electric vehicle 16 is provided with the battery pack accommodating unit 18 within a seat holding unit 30 that holds a seat 28 on which a user sits. The battery pack accommodating unit 18 is shaped like a case. The upper part of the battery pack accommodating unit 18 is open. The seat 28 is rotatable about a not-shown rotary axis provided on the forward side with respect to the direction of travel. When the seat 28 is rotated in the direction where the seat 28 sits on the seat holding unit 30, an opening 18a provided at the upper part of the battery pack accommodating unit 18 is closed.

On the other hand, when the seat 28 is rotated in the direction where the rear end of the seat 28 with respect to the direction of travel separates from the seat holding unit 30, the opening 18a of the battery pack accommodating unit 18 is opened. Through the opening 18a in the open state, the battery pack 12 (FIG. 3) can be stored into or taken out from the battery pack accommodating unit 18. That is, the battery pack 12 is stored in the battery pack accommodating unit 18 in an attachable and removable manner.

In the case of the electric vehicle 16, the male connector 10 is provided on the bottom of the battery pack accommodating unit 18. On the other hand, as described later, the female connector 14 is provided on the bottom of the battery pack 12 (FIG. 3). As a result, once the battery pack 12 is stored in the battery pack accommodating unit 18, the male connector 10 and the female connector 14 (FIG. 4) can be electrically connected, whereby electric power of the battery pack 12 can be supplied to the driving motor 26 through the male connector 10 and the female connector 14 that have been connected to each other.

With reference to FIG. 6, a battery pack charging device 20 according to the present embodiment is explained below. The battery pack charging device 20 is shaped like a case with the upper part thereof being open. The battery pack accommodating unit 22 is formed inside the battery pack charging device 20. The battery pack 12 (FIG. 3) is stored, in an attachable and removable manner, in the battery pack accommodating unit 22 through an opening 22a provided at the upper part thereof. The bottom of the battery pack accommodating unit 22 is provided with the male connector 10. Once the battery pack 12 is stored in the battery pack accommodating unit 22, the male connector 10 of the battery pack accommodating unit 22 and the female connector 14 (FIG. 4) of the battery pack 12 are electrically connected. As a result, electric power can be supplied from the battery pack charging device 20 to the battery pack 12 through the male connector 10 and the female connector 14 that have been connected to each other, whereby the battery pack 12 is charged.

With reference to FIGS. 1 and 2, the male connector 10 is explained in detail below. The male connector 10 includes a plurality of male terminals 44 (seven male terminals in the case of the present embodiment) that are inserted into a plurality of the later-described female terminals 32 of the female connector 14 (FIG. 4) and transmits to or receives from the female terminals 32 electric power or signals. The male connector 10 further includes positioning pins 42 and a support 36 that supports the male terminals 44 arranged at intervals in the arrangement direction (X1-X2 direction). For example, the male terminals 44 are made of a conductor such as metal and are substantially rectangular-shaped. The support 36 is, for example, an insulator made of insulating resin etc.

The support 36 is, for example, plate-shaped with the longitudinal direction being the arrangement direction of the male terminals 44 (arrow X1-X2 direction). The support 36 is fixed to the bottom of the battery pack accommodating unit 18, 22 (FIG. 5, FIG. 6) with screws etc. in such a way that the thickness direction of the support 36 lies along the vertical direction (arrow Y1-Y2 direction). In this state, the upper face 36a of the support 36 faces the inside of the battery pack accommodating unit 18, 22 (FIG. 6) and a lower face 36b of the support 36 faces toward the outside of the battery pack accommodating unit 18, 22.

A plurality of terminal members 34 are provided so as to penetrate the support 36 in the vertical direction. The male terminals 44 are portions of the terminal members 34 that protrude upward (arrow Y1 side) from the upper surface 36a of the support 36. The terminal members 34 include lower protruding portions 46 that protrude downward (arrow Y2 side) from the lower surface 36b of the support 36. As shown in FIG. 6, the male terminals 44 protrude upward from the inner side bottom of the battery pack accommodating unit 18, 22 while being arranged in the arrangement direction in such a way that main surfaces of the substantially rectangular plate-shaped male terminals 44 face each other. Moreover, as shown in FIG. 1, gaps 48 are formed between the male terminals 44 facing each other in the arrangement direction. The lower protruding portions 46 protrude downward outside the battery pack accommodating unit 18, 22 (FIG. 5, FIG. 6) while being arranged in the arrangement direction in the same manner as the male terminals 44.

As shown in FIGS. 1 and 2, on the upper surface 36a of the support 36, there are provided a slope (inclined portion) 50, a plurality of upper covering portions 52, a pair of pin supports 54, and a wall 56, each of which is made of a conductor such as insulating resin. As shown in FIG. 2, the slope 50 has a height difference in the crossing direction (arrow Z1-Z2 direction) that crosses a plane containing the arrangement direction (arrow X1-X2 direction) and the vertical direction (arrow Y1-Y2 direction) and passes through the gaps between the male terminals 44. Due to this height difference, water in the gaps 48 flows from one end side (arrow Z1 side) to the other end side (arrow Z2 side) in the crossing direction and thus is guided to the outside of the gaps 48.

The upper covering portions 52 extend upward from the upper surface 36a of the support 36 and cover the proximal end sides (upper surface 36a sides) of the male terminals 44. When the male connector 10 and the female connector 14 (FIG. 4) are connected, as shown in FIG. 1, the distal end sides (arrow Y1 sides) of the male terminals 44 that are exposed from the upper covering portions 52 are inserted into the female terminals 32. In FIG. 1, of the female terminals 32, only one female terminal (first female terminal 32a) has been illustrated with one-dot chain lines.

The pin supports 54 extend upward from the upper surface 36a of the support 36. As shown in FIG. 1, one pin support 54 is disposed at each end of the arrangement direction of the male terminals 44 and supports the positioning pins 42 protruding upward. It is preferable that the inclined portion 50 is provided even between the pin supports 54 and the male terminals 44 located at both ends of the arrangement direction. The wall 56 is disposed at the lateral direction of the male terminals 44 on one end side (arrow Z1 side) of the crossing direction of the gaps 48 and extends in the arrangement direction, standing upward (arrow Y1 direction).

The lower surface 36b of the support 36 is provided with a plurality of lower covers 58 that extend downward. The lower covers 58 include first lower covers 58a and second lower covers 58b, as shown in FIG. 1. The first lower covers 58a, exposing through a not-shown opening etc. a middle portion of lower protruding portions 46 (hereinafter, also called "first lower protruding portions 46a) disposed at both ends of the arrangement direction, covers the other portions. The second lower covers 58b covers, of the lower protruding portions 46, the proximal end side (lower surface 36b side) of remaining lower protruding portions 46 (hereinafter, also called "second lower protruding portions 46b) that are not covered by the first lower covers 58a.

The first lower protruding portions 46a are electrically connected to a power line (not shown) through the portions exposed from the first lower covers 58a and are electrically connected to the driving motor 26 (FIG. 5) or the battery pack charging device 20 (FIG. 6) through the power line. The second lower protruding portions 46b are electrically connected to a signal transmission line (not shown) through the distal end side (lower end side) exposed from the second lower covers 58b and are electrically connected to a controller (not shown) of the battery pack charging device 20 (FIG. 6) or the electric vehicle 16 (FIG. 5) through the signal transmission line.

Figure 4:
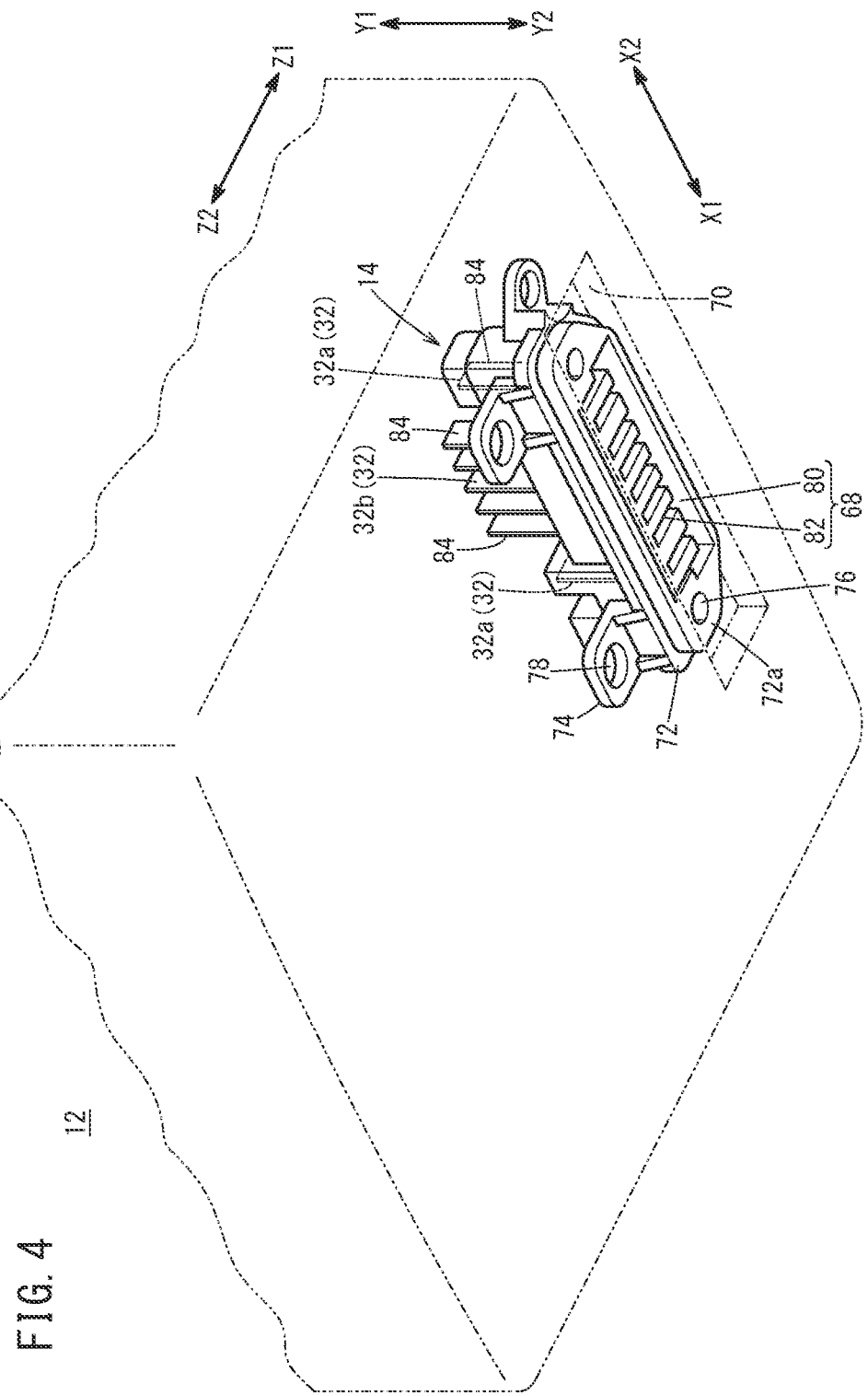
FIG. 4 is a perspective view on the bottom side of the battery pack of FIG. 3.

Next, with reference to FIGS. 3 and 4, the battery pack 12 is briefly explained. As shown in FIG. 3, the battery pack 12 is constituted by housing a not-shown battery core pack, a not-shown battery management device, etc. in a substantially rectangular parallelepiped case 60 that forms the exterior. The battery core pack includes a plurality of fuel cells (not shown) held by a cell holder. The fuel cells are, for example, lithium secondary batteries. When capacity (electricity storage amount) reduces due to, for example, electric power supply to the driving motor 26 (FIG. 5), the capacity of the fuel cells can be restored when the fuel cells are supplied with electric power from the battery pack charging device 20 (FIG. 6). In other words, the fuel cells can repeat charge and discharge. The battery management device performs, for example, control of charge and discharge at the battery core pack and communication with the electric vehicle 16 (FIG. 5) and the battery pack charging device 20 (FIG. 6).

The case 60 is made of, for example, metal such as aluminum, and resin (including fiber reinforced resin). The case 60 is constituted by integrating a shell 62 that is shaped like a case with the upper end open, and a top 64 that closes the opening of the shell 62. The upper surface side of the top 64 is provided with a handle 66 that can be gripped when the battery pack 12 is carried.

The female connector 14 is accommodated at the bottom of the shell 62. As shown in FIG. 4, a bottom wall of the shell 62 is provided with a cutout 70 that exposes to the outside of the case 60 an insertion hole 68 of the female connector 14, which will be described later.

The female connector 14 includes a base 72 and the female terminals 32 that are supported by the base 72 and are arranged at intervals. The base 72 is made of, for example, an insulator such as insulating resin. A side surface of the base 72 is provided with tabs 74 in such a way that the tabs 74 project. A lower end surface 72a of the base 72 is provided with the insertion hole 68 and positioning holes 76. The tabs 74 are each formed with a screw insertion hole 78 into which a screw (not shown) for attaching the base 72 to the bottom wall of the shell 62 is inserted.

The insertion hole 68 includes a wall portion insertion hole 80 that has a shape into which the wall 56 (FIG. 1, FIG. 2) of the male connector 10 can be inserted, and a plurality of terminal insertion holes 82 that have shapes into which the male terminals 44 (FIG. 1, FIG. 2) can individually been inserted. The positioning holes 76 are formed to have a shape into which the positioning pins 42 (FIG. 1, FIG. 2) of the male connector 10 can be inserted.

As shown in FIG. 1 with the two-dot chain lines, each female terminal 32 includes a plate-shaped terminal portion 84 that is substantially rectangular plate shaped, and a branching terminal portion 88 that branches into a first branching portion 88a and a second branching portion 88b at a branching point 86, which is the lower end of the plate-shaped terminal portion 84. The first branching portion 88a and the second branching portion 88b extend a given distance downward from the branching point 86 in a state where the first branching portion 88a and the second branching portion 88b are apart from each other. Thereafter, the first branching portion 88a and the second branching portion 88b come close to each other, thereby forming a proximate portion 90, and then separate again from each other, thereby forming an open end 92 at the lowest end. Most parts on the lower end side of the branching terminal portion 88 of each female terminal 32 are provided inside each terminal insertion hole 82 (FIG. 4).

As shown FIG. 4, of the female terminals 32, in the case of the first female terminals 32a disposed at both ends in the arrangement direction, the plate-shaped terminal portions 84 are disposed in the base 72 whereas in the case of second female terminals 32b except the first female terminals 32a, the upper end sides of the plate-shaped terminal portions 84 protrude upward from the base 72. In the case of each first female terminal 32a, part of the plate-shaped terminal portion 84 is exposed from the base 72 through a not-shown opening provided for the base 72. The exposed portion is electrically connected to a power line (not shown). In this way, each first female terminal 32a is electrically connected to an input/output terminal (not shown) of the battery core pack via the battery management device. Each second female terminal 32b is electrically connected to a signal transmission line (not shown) through the upper end side of the plate-shaped terminal portion 84 that protrudes from the base 72, thereby being electrically connected to the battery management device etc. through the signal transmission line.

The battery pack 12 basically constructed as shown above is inserted into the battery pack accommodating unit 18, 22 (FIG. 5, FIG. 6) from the bottom side by a user gripping the handle 66 (FIG. 3) provided on the upper end side of the battery pack 12. At this time, the female connector 14 provided at the bottom of the battery pack 12 and the male connector 10 (FIG. 5, FIG. 6) provided at the bottom of the battery pack accommodating unit 18, 22 are positioned in such a way that the female connector 14 and the male connector 10 face each other. When the battery pack 12 is accommodated in the battery pack accommodating unit 18, 22, the wall 56 of the male connector 10, the male terminals 44, and the positioning pins 42 shown in FIGS. 1 and 6 are inserted into the wall portion insertion hole 80, the terminal insertion holes 82, and the positioning holes 76 of the female connector 14 shown in FIG. 4, respectively until the lower end surface 72a (FIG. 4) of the base 72 of the female connector 14 and distal end surfaces 54a (FIGS. 1, 6) of the pin supports 54 of the male connector 10 contact each other.

When the male terminals 44 are inserted into the terminal insertion holes 82, each distal end side of the male terminals 44 is inserted in between the first branching portion 88a and the second branching portion 88b through the open end 92 of the female terminal 32 as shown in FIG. 1 in the insertion holes 82. At the proximate portion 90, the male terminal 44 is interposed between the first branching portion 88a and the second branching portion 88b, whereby the first branching portion 88a and the second branching portion 88b are elastically deformed in the direction they separate from each other. That is, the first branching portion 88a and the second branching portion 88b are kept in a state where they contact the male terminal 44 with their elastic force. As a result, the proximate portion 90 becomes an electrical connection point between the female terminal 32 and the male terminal 44.

Thus, when the battery pack 12 (FIG. 3) is accommodated in the battery pack accommodating unit 22 (FIG. 6) of the battery pack charging device 20, the fuel cells can be charged through the female connector 14 and the male connector 10 connected to each other. On the other hand, when the battery pack 12 is accommodated in the battery pack accommodating unit 18 (FIG. 5) of the electric vehicle 16, electric power of the battery pack 12 can be supplied to the driving motor 26 etc. through the female connector 14 and the male connector 10 connected to each other.

As described above, the male connector 10, and the electric vehicle 16 and the battery pack charging device 20 including the male connector 10 according to the present embodiment can guide water from the gaps 48 between the male terminals 44 to the outside of the gaps 48 since there are differences in height in the slope 50 provided on the upper surface 36a of the support 36 as shown in FIG. 2. Therefore, water such as raindrop can be prevented from stagnating between the male terminals 44 and as a result, it is possible to prevent fault currents from occurring between the male terminals 44.

In the case of the male connector 10, the electric vehicle 16, and the battery pack charging device 20 according to the embodiments above, the slope 50 is formed to slope down from one end side (arrow Z1 side) to the other end side (arrow Z2 side) of the crossing direction in the gaps 48, which are located between the male terminals 44 adjacent to each other in the arrangement direction as shown in FIG. 2. In this case, as described above, water can be guided from one end side to the other end side of the crossing direction of the gaps 48 and thus it is possible to prevent water from stagnating in the gaps 48.

As shown in FIGS. 1 and 2, the male connector 10, the electric vehicle 16, and the battery pack charging device 20 according to the embodiments above have been provided with the wall 56 only on one end side (arrow Z1 side) out of two sides (arrow Z1 side and arrow Z2 side) of the crossing direction of the gaps 48 located between the male terminals 44, the wall 56 extending in the arrangement direction (arrow X1, X2 direction) and standing upward (arrow Y1 side), adjacent to the male terminals 44. Even if the wall 56 is provided in this way, the slope 50 can guide water from one end side of the crossing direction of the gaps 48 to the other end side where the wall 56 is not present, and discharge the water, whereby it is possible to prevent the water from stagnating in the gaps 48. The male connector 10 may omit the wall 56.

The present invention is not limited to the above-described embodiments, and various modifications can be made without departing from the gist of the present invention.

For example, as shown in FIG. 7, the male connector 10 may be provided with a slope (inclined portion) 94 instead of the slope 50 without the wall 56. The slope 94 has a height difference in such a way that the slope 94 slopes down from the inner side to the outer side of the crossing direction (arrow Z1, Z2 direction) of the gaps 48. For a female connector 14 (FIG. 4) that is connected to this type of male connector 10, the insertion hole 68 may omit the wall portion insertion hole 80.

The male connector 10 that has the slope 94 can guide water from the inner side to the outer side of the crossing direction of the gaps 48. Therefore, as in the embodiments above, it is possible to prevent water from stagnating in the gaps 48 and thus fault currents etc. can be prevented from occurring between the male terminals 44.

What is claim is:

1. A male connector comprising a plurality of male terminals connected to a plurality of female terminals, wherein the plurality of female terminals and the plurality of male terminals are connected and transmit electric power or a signal,
the male connector further comprising a support configured to support the plurality of male terminals disposed at intervals in an arrangement direction,
wherein the plurality of male terminals protrude upward from an upper surface of the support, and
the upper surface of the support is provided with a wall and an inclined portion,
the wall is located at one end in a crossing direction that crosses a plane that contains the arrangement direction and a protruding direction in which the plurality of male terminals protrude on the upper surface and the wall extends along at least part of the plurality of male terminals,
the inclined portion has a difference in height in the crossing direction in a manner so that the one end in the crossing direction is higher and the inclined portion slopes down from the one end to another end in the crossing direction,
a gap is formed between the plurality of male terminals facing each other in the arrangement direction,
the gap is formed by
two adjacent male terminals of the plurality of male terminals in the arrangement direction and
the wall closing the one end in the crossing direction,
the gap includes an opening at the other end in the crossing direction, and
the inclined portion in the gap slopes down from the wall to the opening.

2. The male connector according to claim 1, wherein the wall is in contact with the plurality of male terminals.

3. The male connector according to claim 1, wherein a female connector configured to be connected to the male connector includes the plurality of female terminals and a wall portion insertion hole, and the wall is insertable into the wall portion insertion hole.

4. An accommodating device comprising a male connector that includes a plurality of male terminals connected to a plurality of female terminals provided for an electricity storage device, wherein the plurality of female terminals and the plurality of male terminals are connected and transmit electric power or a signal, the male connector further including a support configured to support the plurality of male terminals disposed at intervals in an arrangement direction,
wherein the plurality of male terminals protrude upward from an upper surface of the support, and
the upper surface of the support is provided with a wall and an inclined portion,
the wall is located at one end in a crossing direction that crosses a plane that contains the arrangement direction and a protruding direction in which the plurality of male terminals protrude on the upper surface and the wall extends along at least part of the plurality of male terminals,
the inclined portion has a difference in height in the crossing direction in a manner so that the one end in the crossing direction is higher and the inclined portion slopes down from the one end to another end in the crossing direction,
a gap is formed between the male terminals facing each other in the arrangement direction,
the gap is formed by
two adjacent male terminals of the plurality of male terminals in the arrangement direction and
the wall closing the one end in the crossing direction,
the gap includes an opening at the other end in the crossing direction, and
the inclined portion in the gap slopes down from the wall to the opening.

5. The accommodating device according to claim 4, wherein
the accommodating device is a charging device configured to charge the electricity storage device, and
the accommodating device charges the electricity storage device through the male connector.

6. The accommodating device according to claim 4, wherein
the accommodating device is a vehicle that is supplied with electric power by the electricity storage device, and
the vehicle is supplied with electric power through the male connector.

7. The accommodating device according to claim 4, wherein the wall is in contact with the plurality of male terminals.

8. The accommodating device according to claim 4, wherein a female connector configured to be connected to the male connector includes the plurality of female terminals and a wall portion insertion hole, and the wall is insertable into the wall portion insertion hole.

* * * * *